(12) United States Patent
Burrows et al.

(10) Patent No.: US 8,578,762 B2
(45) Date of Patent: Nov. 12, 2013

(54) SPARK PLUG WITH INTEGRAL COMBUSTION SENSOR AND ENGINE COMPONENT THEREWITH

(75) Inventors: John A. Burrows, Northwich (GB); Paul Tinwell, Fayence (FR)

(73) Assignee: Federal-Mogul Ignition Company, Southfield, MI (US)

( * ) Notice: Subject to any disclaimer, the term of this patent is extended or adjusted under 35 U.S.C. 154(b) by 385 days.

(21) Appl. No.: 12/696,532

(22) Filed: Jan. 29, 2010

(65) Prior Publication Data

US 2010/0186490 A1    Jul. 29, 2010

Related U.S. Application Data

(60) Provisional application No. 61/148,121, filed on Jan. 29, 2009.

(51) Int. Cl.
*G01M 15/08*    (2006.01)

(52) U.S. Cl.
USPC ..................................................... 73/114.19

(58) Field of Classification Search
USPC .............................. 73/114.16, 114.18, 114.19
See application file for complete search history.

(56) References Cited

U.S. PATENT DOCUMENTS

| | | | |
|---|---|---|---|
| 4,169,388 A * | 10/1979 | Teitelbaum et al. | 73/714 |
| 4,881,403 A * | 11/1989 | Kagawa et al. | 73/114.19 |
| 5,479,817 A * | 1/1996 | Suzuki et al. | 73/114.19 |
| 5,726,351 A * | 3/1998 | Glaser | 73/114.19 |
| 6,204,594 B1 | 3/2001 | Ingham | |
| 6,548,945 B1 | 4/2003 | Tamura | |
| 6,756,722 B2 * | 6/2004 | Hiramatsu | 313/144 |
| 7,272,970 B2 * | 9/2007 | Ozeki et al. | 73/35.12 |
| 7,305,954 B2 * | 12/2007 | Hagiwara et al. | 123/143 B |
| 7,328,677 B2 * | 2/2008 | Hagiwara et al. | 123/143 B |
| 2002/0121127 A1 | 9/2002 | Kiess et al. | |
| 2002/0195917 A1 | 12/2002 | Hiramatsu | |
| 2004/0129059 A1 * | 7/2004 | Kiess et al. | 73/35.12 |
| 2010/0116039 A1 * | 5/2010 | Ramond et al. | 73/114.19 |

FOREIGN PATENT DOCUMENTS

| | | |
|---|---|---|
| JP | 6140125 A | 5/1994 |
| JP | 09-219273 A | 8/1997 |
| JP | 11-144838 A | 5/1999 |
| JP | 2007-141868 A | 6/2007 |
| KR | 1020080098527 A | 11/2008 |
| WO | WO 2008/003846 A1 | 1/2008 |

* cited by examiner

*Primary Examiner* — Eric S McCall
(74) *Attorney, Agent, or Firm* — Robert L. Stearns; Dickinson Wright, PLLC

(57) ABSTRACT

A spark plug assembly includes an insulator having an upper shoulder and a lower shoulder and a metal annular outer shell having an outer surface and a cavity bounded by an inner surface. The inner surface has a flange extending inwardly to confront the lower shoulder of the insulator. The outer shell has a proximal end and an opposite fastening end. The fastening end has an external threaded region and an annular sealing seat extending outwardly adjacent the flange. The outer shell has an annular shoulder extending radially between the sealing seat and the proximal end. The proximal end has a turnover axially confronting the upper shoulder of the insulator. A sensor assembly is received about the outer shell between the shoulder of the shell and the turnover. The sensor assembly is responsive to send a signal in response to relative axial movement between the insulator and the outer shell.

16 Claims, 4 Drawing Sheets

SPARK PLUG WITH INTEGRAL COMBUSTION SENSOR AND ENGINE COMPONENT THEREWITH

CROSS-REFERENCE TO RELATED APPLICATION

This application claims the benefit of U.S. Provisional Application Ser. No. 61/148,121, filed Jan. 29, 2009, which is incorporated herein by reference in its entirety.

BACKGROUND OF THE INVENTION

1. Technical Field

This invention relates generally to ignition devices, and more particularly to spark plugs having an integral combustion sensor.

2. Related Art

It is known to incorporate a sensor in a spark plug assembly to sense the combustion pressure within a cylinder bore during use of the engine. By being able to sense the magnitude of the combustion pressure, it can be determined if the engine is operating as intended, or if service is needed. Unfortunately, current integral sensor spark plug technology is limited in its ability to provide an accurate measurement of the combustion pressure due to various unwanted influences exerting forces on the sensors in addition to the combustion gas forces. These unwanted forces applied to the integral sensor generally occur during installation and/or while the engine is in operation. Accordingly, the pressure measurements obtained by the sensors may not be a true and accurate indication of the combustion forces.

As shown in FIG. 1, a known spark plug assembly 1 has an integral sensor 2 for sensing combustion forces within a cylinder bore. The assembly 1 has a ceramic insulator 3 fixed within a metal outer shell 4. The insulator 3 is fixed under compression between a turnover 5 of the shell 4 and an internal gasket 6. The compression exerted on the insulator 3 acts to provide a reliable seal at the gasket 6 during operating conditions. The sensor 2 is maintained under compression between an external flange 7 of the shell 4 and a hexagonal fitting 8. In operation, combustion forces exerted on a core nose 9 of the insulator 3 pushes the insulator 3 upwards axially away from the cylinder bore, wherein some of the force is transferred through the shell turnover 5 into the shell 4, which in turn, acts to stretch a flexible upper section 10 of the shell 4. As the flexible upper section 10 is stretched, the compression force imparted on the sensor 2 is reduced, which is interpreted as a direct correlation of the combustion force within the cylinder bore. However, during installation of the spark plug assembly 1 into the cylinder block, a tensile force is established between an external thread region 11 of the shell 4 and a gasket sealing face 12 on the bottom sealing surface of the external flange 7. The magnitude of the tensile force can vary from one assembly to another as a result of tightening torque tolerances and during normal use due to, for example, temperature fluctuations or uncontrolled deformations of the cylinder head. Regardless of the magnitude of the tensile force, the tensile force tends to reduce the force that compresses the insulator 3 between the turnover 5 and the gasket 6 in an uncontrollable and unknown manner. As such, the tension exerted during combustion on the flexible section 10 is reduced, which directly affects the "as assembled" preload force applied on the sensor 2 in an unknown and uncontrollable fashion. Thus, the force magnitudes indicated by the sensor 2 during combustion may not be an accurate indication of the compression pressure within the cylinder bore.

SUMMARY OF THE INVENTION

A spark plug assembly includes a generally annular ceramic insulator having an upper shoulder and a lower shoulder and a metal annular outer shell having an outer surface and a central cavity bounded by an inner surface. The inner surface of the shell has a flange extending radially inwardly to axially confront the lower shoulder of the insulator. The outer shell has a proximal end and an opposite fastening end. The fastening end has an external threaded region and an annular sealing seat extending radially outwardly from the threaded region adjacent the flange. Further, the outer shell has an annular shoulder extending radially between the sealing seat and the proximal end. The proximal end has an annular turnover extending radially inwardly toward the cavity to axially confront the upper shoulder of the insulator and inhibit axial movement of the insulator relative to the outer shell. Further, a sensor assembly is received about the outer shell between the shoulder of the shell and the turnover. The sensor assembly is responsive to send a signal in response to relative axial movement between the insulator and the outer shell.

In accordance with another aspect of the invention, an internal combustion engine component is provided. The component includes a cylinder head having an upper surface and a lower surface with an opening extending between the upper and lower surfaces. The opening has a reduced diameter region adjacent the lower surface and an increased diameter region adjacent the upper surface with a sealing seat extending between the reduced diameter region and the increased diameter region. Further, the component includes a spark plug assembly configured to be fastened in the opening. The spark plug assembly includes a generally annular ceramic insulator having an upper shoulder and a lower shoulder and a metal annular outer shell having an outer surface extending between a proximal end and an opposite fastening end with a central cavity bounded by an inner surface. The inner surface has a radially extending flange axially confronting the lower shoulder of the insulator. The fastening end has an external threaded region configured for threaded engagement with the reduced diameter region of the cylinder head with an annular sealing seat extending adjacent the threaded region and axially confronting the sealing seat of the cylinder head. An annular shoulder extends radially between the sealing seat and the proximal end. The proximal end has an annular turnover axially confronting the upper shoulder of the insulator. A sensor assembly is received about the outer shell between the shoulder and the turnover. The sensor assembly is responsive to send a signal in response to relative axial movement between the insulator and the outer shell.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
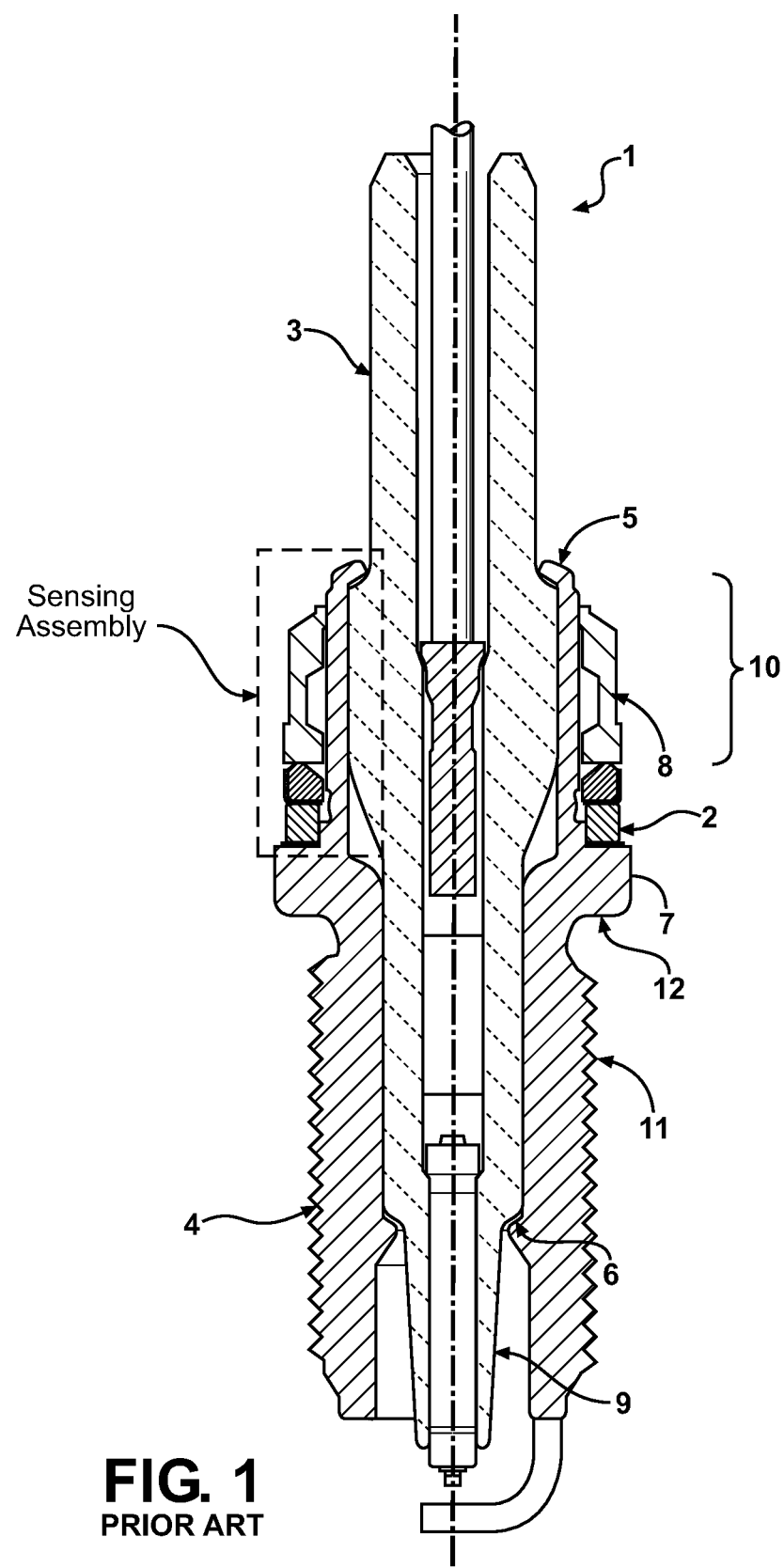
FIG. 1 is a cross-sectional view of a spark plug constructed in accordance with the prior art.
Figure 2:
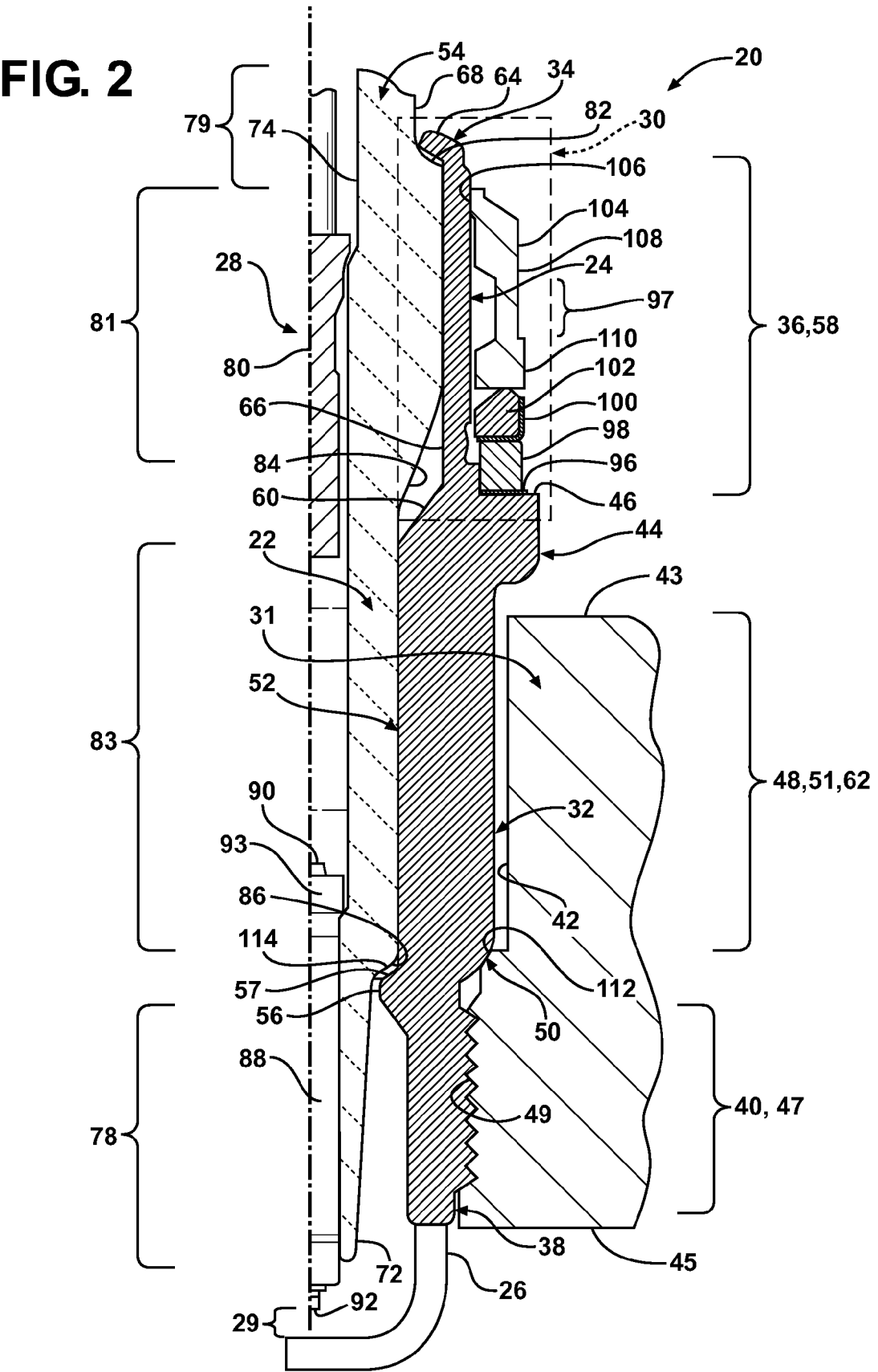
FIG. 2 is a partial cross-sectional view of a spark plug constructed in accordance with one aspect of the invention.

Referring in more detail to the drawings, FIG. 2 illustrates a half section of a spark plug assembly 20 constructed in accordance with one presently preferred embodiment of the invention. The assembly 20 has an annular ceramic insulator 22 and a metal annular shell 24 surrounding at least a portion of the ceramic insulator 22. A ground electrode 26 is operatively attached to the shell 24 and a center electrode assembly 28 has an elongate body extending through the insulator 22, with the center electrode assembly 28 and the ground electrode 26 providing a spark gap 29, as is known. A sensor assembly outlined generally at 30 is integrally assembled externally about the shell 24 and is configured to indicate the combustion pressure within a cylinder bore of a cylinder block (not shown) over which the spark plug assembly 20 is positioned. The spark plug assembly 20 is configured for attachment to an internal combustion engine component, shown here as a cylinder head 31, such that the sensor assembly 30 measures the combustion pressure within individual cylinder bores accurately without being affected by extraneous forces, e.g. tensile forces established while threading the spark plug assembly 20 to the cylinder head 31 and temperature changes and/or uncontrolled deformations of the cylinder head 31.

The electrically conductive metal outer shell 24 may be made from any suitable metal, including various coated and uncoated steel alloys. The shell 24 has a generally tubular body with a generally annular outer surface 32 extending between an upper terminal end 34 including a barrel portion 36 and a lower fastening end 38. The fastening end 38 has an external threaded region 40 configured for threaded attachment within a combustion chamber opening 42 of the cylinder head 31, wherein the opening 42 extends between an upper, substantially planar surface 43 and a lower, substantially planar surface 45 configured for abutment with the engine block (not shown). The opening 42 has a reduced diameter portion 47 extending between a sealing seat 112 and the lower planar surface 45, wherein the portion 47 has female threads 49 configured for threaded engagement with the threaded region 40 of the shell 24. Further, the opening 42 has an enlarged diameter portion 51 that extends from the sealing seat 112 to the upper planar surface 43. The portion 51 has a diameter sized for a loose radial clearance fit with the shell 24. The shell 24 also has an annular shoulder or flange 44 extending radially outwardly from the outer surface 30 adjacent a lowermost portion of the barrel portion 36 to provide an annular, generally planar upper surface or shoulder 46. The flange 44 is spaced axially from the threaded region 40 by a straight cylindrical portion 48 slightly greater in diameter from the threaded region 40 and reduced in diameter from the flange 44. The cylindrical portion 48 is sized for a radial clearance fit within the opening 42 of the cylinder head 31. The cylindrical portion 48 has a lowermost annular edge or corner that is conically chamfered to provide a tapered sealing seat 50 adjacent the threaded region 40, wherein the sealing seat 50 of the shell 24 is configured for sealed abutment with the sealing seat 112 of the cylinder head 31.

The ground electrode 26 is attached to the fastening end 38 and is depicted in part having a commonly used single L-shaped style, although it will be appreciated that multiple ground electrodes of straight, bent, annular, trochoidal and other configurations can be substituted depending upon the intended application for the spark plug assembly 20, including two, three and four ground electrode configurations, and those where the electrodes are joined together by annular rings and other structures used to achieve particular sparking surface configurations.

The tubular shell body of the outer shell 24 has an inner wall or surface 52 providing an open cavity 54 extending through the length of the shell between the terminal and fastening ends 34, 38. An internal lower flange 56 extends radially inwardly from the inner surface 52 adjacent the external sealing seat 50 to provide a lower seal surface 57 aligned radially or substantially radially inwardly from the external sealing seat 50. The inner surface 52 is represented as having an enlarged diameter region 58 adjacent the terminal end 34 to accommodate an increased diameter region 81 of the insulator 22. Accordingly, an annular intermediate flange or shoulder 60 extends radially inwardly from the enlarged diameter region 58 to a reduced diameter region 62 of the cavity 54. The shoulder 60 is aligned or substantially aligned radially inwardly from the external flange 44, wherein the enlarged diameter region 58 extends upwardly from the shoulder 60 along a substantially straight, cylindrical and constant diameter to an annular turnover 64 that extends radially inwardly to axially confront and retain the insulator 22 in the cavity 54. The shell 24 may also include a deformable buckle zone 66 which is designed and adapted to collapse axially and radially outwardly in response to heating of the buckle zone 66 and associated application of an overwhelming axial compressive force subsequent to the deformation of the turnover 64 in order to hold the shell 24 in a fixed axial position with respect to the insulator 22 and form a gas-tight seal between insulator 22 and the shell 24. Gaskets, cement, or other packing or sealing compounds can also be interposed between the insulator 22 and the shell 24 to perfect a gas-tight seal and to improve the structural integrity of the spark plug assembly 20.

Unlike most spark plug shells, the shell 24 does not include an attachment portion on the barrel portion 36, such as a tool receiving hexagon or other feature for removal and installation of the spark plug in a combustion chamber opening. The outer surface of the barrel portion 36 remains substantially cylindrical. Rather, an attachment portion is incorporated into the sensor assembly 30 as discussed below.

The insulator 22, which may include aluminum oxide or another suitable electrically insulating material having a specified dielectric strength, high mechanical strength, high thermal conductivity, and excellent resistance to thermal shock, may be press molded from a ceramic powder in a green state and then sintered at a high temperature sufficient to densify and sinter the ceramic powder. The insulator 22 has an elongate body with an annular outer surface 68 extending between an upper terminal or proximal end (out of view) and a lower core nose end or distal end 72. The insulator 22 is of generally tubular or annular construction, including a central bore or passage 74, extending longitudinally between an upper mast portion proximate the terminal or proximal end and a lower nose portion 78 proximate the distal end 72. The central passage 74 is of varying cross-sectional diameter, shown here, by way of example, as being generally greatest at or adjacent the terminal end and smallest at or adjacent the core nose end 72, thereby generally having a continuous series of tubular sections of varying diameter. These sections include a first insulator section 79 which surrounds a connector extension of a terminal stud 80 of the center electrode assembly 28. This first insulator section 79 transitions to an uppermost or upper first insulator shoulder 82 which is in pressing engagement with the turnover 64 of the shell 24 and in turn transitions to a second insulator section 81 having an increased diameter which is greater than the diameter of the first insulator section, represented here as being a maximum diameter region that is housed within the barrel portion 36 of the shell 24. The second section 81 transitions to a third insulator section 83 via a second shoulder, also referred to as an intermediate shoulder 84. The third insulator section 83 preferably has a diameter less than the diameter of the second insulator section 81, and generally less than the diameter of the first insulator section 79. The third section 83 transitions to the core nose portion 78 via a third shoulder, also referred to as lower insulator shoulder 86.

The center electrode assembly 28 has a center electrode 88 that may have any suitable shape, and is represented here, by way of example and without limitation, as having a body with a generally cylindrical outer surface extending generally between an upper terminal end 90 having a radially outward arcuate flair or taper to an increased diameter head 93 and a lower firing end 92. The annular head 93 facilitates seating and sealing the terminal end 90 within insulator 22, while the firing end 92 generally extends out of the nose portion 78 of the insulator 22. The center electrode 88 is constructed from any suitable conductor material, as is well-known in the field of sparkplug manufacture, such as various Ni and Ni-based alloys, for example, and may also include such materials clad over a Cu or Cu-based alloy core.

The integral pressure sensor assembly 30 is a piezo-based sensor assembly which is operative as a pressure transducer to convert mechanical elastic strain energy induced into the spark plug assembly 20 by variation of in-cylinder pressure into an electrical signal that can be output from the sensor assembly and thereby provide important information about the combustion events which are in turn used for various vehicle control functions. The piezo sensor assembly may be either a piezoelectric sensor assembly that produces a variable output voltage as a sensor signal or a piezoresistive sensor assembly that produces a variable resistance as a sensor signal, depending on the piezo transducer selected.

The piezo sensor assembly 30 abuts the barrel shoulder or flange surface 46 and extends upwardly from the flange 44 along the barrel portion 36. The piezo sensor assembly 30 includes a lower electrode contact 96, a piezo transducer 98, an upper electrode contact 100, an isolator 102 and an upper bushing 104. These elements are placed over the barrel portion 36 in the sequence listed and operatively joined together by application of a compressive assembly preload and held together under the assembly preload by fixing the upper bushing 104 to the outer surface of the barrel portion 36, such a by weld joint.

The lower electrode contact 96 is in the form of a thin ring having an inner diameter that is greater than the outer diameter of the barrel portion 36 such that the lower electrode contact 96 may be assembled by placing it over the barrel portion 36. The outer diameter of the lower electrode contact 96 is sized appropriately in conjunction with the barrel shoulder 46 to enable it to rest on the barrel shoulder 46. As such, a lower surface of lower electrode contact 96 abuts the barrel shoulder 46 and an upper surface provides both the mechanical seat and electrical contact for the piezo transducer 98. The barrel shoulder 46 is of an appropriate thickness so that it does not plastically deform in response to the assembly preload. The lower electrode contact 96 may be made from any suitable electrically conductive material, including many pure metals and alloys. However, it is preferred that lower electrode contact 96 be formed from a conductive material which is not easily degraded with regard to its properties as an electrical contact in an engine operating environment, including having resistance to high temperature oxidation and corrosion processes known to occur in these environments, such as brass, by way of example and without limitation.

The piezo transducer 98 is in the form of a cylindrical ring or disk. While many cross-sectional configurations are believed to be possible, the piezo transducer 98 may have a rectangular cross-section, including a square cross-section. The piezo transducer 98 may be either a piezoelectric transducer that is operative to produce a variable output voltage as a sensor signal or a piezoresistive transducer that is operative to produce a variable resistance as a sensor signal. The piezo transducer 98 has an inner diameter that is greater than the outer diameter of barrel portion 36 such that it may be assembled by placing it over the barrel portion 36. In addition, the inner diameter is sized so as not to contact the barrel portion 36 during manufacture and operation, thereby avoiding frictional loses associated with the movement of the transducer. The inner and outer diameters of the piezo transducer 98 are sized appropriately in conjunction with lower electrode contact 96 so as to enable the lower surface of piezo transducer 98 to rest on the upper surface of lower electrode contact 96. The same diametral relationship holds true with respect to the contact between the upper surface of piezo transducer 98 and the lower surface of the upper electrode contact 100. The piezo transducer 98 may be formed from any suitable piezoelectric or piezoresistive material. In one exemplary embodiment, the piezo transducer 98 is a piezoelectric transducer formed from a piezo ceramic. The piezo ceramic may include titanates, niobates, tantalates, tungstates or quartz.

The upper electrode contact 100 is in the form of a L-shaped ring having an inner diameter that is greater than the outer diameter of the barrel portion 36 such that upper electrode contact 100 may be assembled by placing it over the barrel portion 36. The inner diameter is sized so as to remain spaced and electrically isolated from the outer surface of the barrel portion 36. The outer diameter of upper electrode contact 100 is sized appropriately in conjunction with the upper surface of the piezo transducer 98 to enable the lower surface of the upper electrode contact 100 to cover the upper surface of the piezo transducer 98. The upper electrode contact 100 may be made from any suitable conductive material, including many pure metals and alloys. However, it is also preferred that upper electrode contact 100 be formed from a conductive material which is not easily degraded with regard to its properties as an electrical conductor in an engine operating environment, including having resistance to high temperature oxidation and corrosion processes known to occur in these environments, such as brass, by way of example and without limitation. The lower surface of upper electrode contact 100 abuts the upper surface of the piezo transducer 98 to provide both the mechanical seat and electrical contact for the piezo transducer 98. Electrical contact with the piezo sensor assembly 30 for transmitting electrical signal output of the assembly is made through the upper electrode contact 100, preferably by making a suitable electrical contact with a signal wire (not shown). Any suitable form of electrical contact can be utilized, such as a shielded co-axial cable.

The isolator 102 is in the form of a chamfered cylindrical ring or disk. While many cross-sectional configurations are believed to be possible, the isolator 102 may have a generally rectangular cross-section, including a square cross-section, with a flat lower surface and a convex upper surface, or an upper surface that is truncated by at least one chamfer, shown here as having a pair of small chamfers or radii along opposite circumferential edges. By altering the number of chamfers, length of the chamfers and their angle, line contact can be ensured between the isolator 102 and the upper bushing 104, and the axis of the line of contact can be shifted radially inwardly or outwardly, as desired. By limiting the contact to a line contact via the converging chamfers, the application of radial forces associated with the elements of the sensor, including those associated with thermal expansion, mismatch of the elements can be reduced. In addition, the application of the axial forces can be more precisely controlled as to the location of the application of the forces as well as the magnitude of the forces applied. By reducing the contact surface area, non-uniformity of the forces applied through the surface to the associated components is also reduced. The isolator 102 may be made from any electrically insulating material that is operative to electrically isolate the upper electrode contact 100 and the piezo transducer 98. The isolator 102 is also a mechanical actuator transferring mechanical energy to the upper electrode contact 100 and the piezo transducer 98 and is preferably formed from a material having a high modulus of elasticity at engine operating temperatures, particularly in compression, such as a ceramic. The isolator 102 has a diameter that is greater than the outer diameter of the barrel portion 36 such that isolator 102 may be assembled by placing it over the barrel portion 36, and is sized so as not to contact the barrel portion 36 during manufacture and during operation of the piezo sensor assembly 30, thereby avoiding frictional loses associated with the axial movement of the isolator 102. The inner and outer diameters of the isolator 102 are sized appropriately in conjunction with the upper electrode contact 100 so as to enable the lower surface of the isolator 102 to rest on the upper surface of the upper electrode contact 100 while also fitting within the L-shaped leg of the upper electrode contact 100. The height of the isolator 102 is sufficiently large to provide electrical and mechanical isolation of the L-shape leg of the upper electrode contact 100 from the upper bushing 104. The isolator 102 may be formed from any suitable dielectric material, such as an alumina-based ceramic, such as that used for the insulator 22, for example.

The upper bushing 104 engages and is welded to the outer surface of the barrel portion 36. The elements of the piezo sensor assembly 30 are in touching contact under a compressive preload by pressure applied from the upper bushing 104 to the upper surface of the isolator 102. The welding of the upper bushing 104 to the barrel portion 36 fixes the desired preload. The upper bushing 104 is in the form of a cylindrical ring having an inner diameter that is greater than the outer diameter of the barrel portion 36 such that the upper bushing 104 may be assembled by placing it over the barrel portion 104. The upper bushing 104 includes an inwardly extending alignment lip 106. The inner diameter of the lip 106 is slightly less than the outer diameter of the barrel portion 36 to establish a slight interference fit and aid in the concentric alignment of the upper bushing 104. The cylindrical ring shape of the upper bushing 104 has a thinned section 108 which is thinned by incorporation of a counterbore on the inside diameter of a midsection 97 of the bushing 104. By incorporation of the thinned section 108, the elastic flexibility of the upper bushing 104 is increased providing a spring-like radial response characteristic to the upper bushing 104. The outer surface of the upper bushing 104 has a suitable spark plug attachment feature 110, such as a hex or bi-hex. The feature size will preferably conform with an industry standard tool size of this type for the related spark plug application. Of course, some applications may call for a tool receiving interface other than a hexagon, such as slots to receive a standard spanner wrench, or other features such as are known in racing spark plug and other applications and in other environments. The upper bushing 104 may also include a lug which may be used for attachment of a signal cable and connector (not shown) used to transmit the output signal from the piezo sensor assembly 30 to a signal processing device, such as an engine controller or other engine diagnostic device. Alternately, the upper bushing 104 can also be formed without a lug. The upper bushing 104 may be made from any suitable material, including various grades of steel and plated steel. However, it is preferred that the upper bushing 104 be made from a material having a coefficient of thermal expansion that is less than steel and as close as possible to that of the ceramic insulator material, such as Kovar, that also has enhanced performance in an engine operating environment, including having resistance to high temperature oxidation and corrosion processes known to occur in these environments. Kovar is a nickel-cobalt-iron alloy having a nominal composition, by weight, of about 29% Ni, 17% Co, 0.30% Mn, 0.20% Si and 0.02% C and the balance Fe. The lower surface of the upper bushing 104 abuts the upper surface of the isolator 102 and provides the mechanical seat for the isolator 102.

During assembly, the elements of piezo sensor assembly 30 are placed over the barrel portion 36; subjected to a compressive preload of about 360 lbs., and then the upper bushing 104 is laser-welded to the barrel portion 36 to fix the desired assembly preload. During attachment of the finished spark plug assembly 20 into the threaded opening 42 of the cylinder head 31, the forces applied by the cylinder head 31 to the spark plug assembly 20 do not have any significant affect of the compressive preload imparted on the transducer 98 during assembly of the sensor assembly 30. This results in part because the flange 44 remains spaced from and out of contact with the upper, planar surface 43 the cylinder head 31 upon being assembled thereto. Rather, the seating between the shell 24 and the cylinder head 31 takes place internally to the cylinder head 31 between the sealing seat 50 of the shell 24 and the reduced diameter annular sealing seat 112 formed within the opening 42 of the cylinder head 31 between the upper and lower surfaces 43, 45. This location of seating engagement is immediately adjacent the location where the third or lower shoulder 86 of the insulator 22 seats against the lower flange 56 of the shell 24, wherein a seal gasket 114 can be used to facilitate formation of a gas-tight seal. As such, the sealing seat 112 in the cylinder head 31 is configured to be radially aligned or substantially radially aligned with the lower flange 56 upon assembly. Further, the sealing seat 112 is formed a predetermined axial distance from the upper surface 43 of the cylinder head 31 to ensure that upon completing assembly of the spark plug assembly 20 to the cylinder head 31, the flange 44 of the shell 24 remains spaced axially from the cylinder head upper surface 43. As such, with the compressive load applied between the shell 24 and the cylinder head 31 and the compressive load applied between the lower shoulder 86 of the insulator 22 and the lower flange 56 of the shell 24 being radially aligned or substantially radially aligned with one another, the shell 24 remains substantially free of any axial distortion which could otherwise affect the loading on the sensor assembly 30. Accordingly, the insulator 22 remains in its axial position relative to the shell 24, and thus, the axial load applied to the sensor assembly 30 during assembly of the spark plug assembly 20 to the cylinder head 31 is maintained as initially established during assembly of the sensor assembly 30 to the shell 24. Accordingly, the signal sent by the sensor assembly 30 during use is a true and accurate indication of the compression pressures being applied to the nose portion 78 of the insulator 22. To avoid having an affect on the sensor assembly 30, it is desired that the location discussed with regard to the relative axial location of the load applied between the shell 24 and the cylinder head 31 and load applied between the insulator 22 and the third shoulder 86 of the shell be substantially adjacent one another, and more preferably with the load between the shell 24 and the cylinder head 31 being radially aligned with the load between the insulator 22 and the lower shoulder 86. This keeps the insulator 22 from being shifted axially relative to the shell 24 during assembly of the spark plug assembly 20 in the opening 42 of the cylinder head 31.

Figure 3:
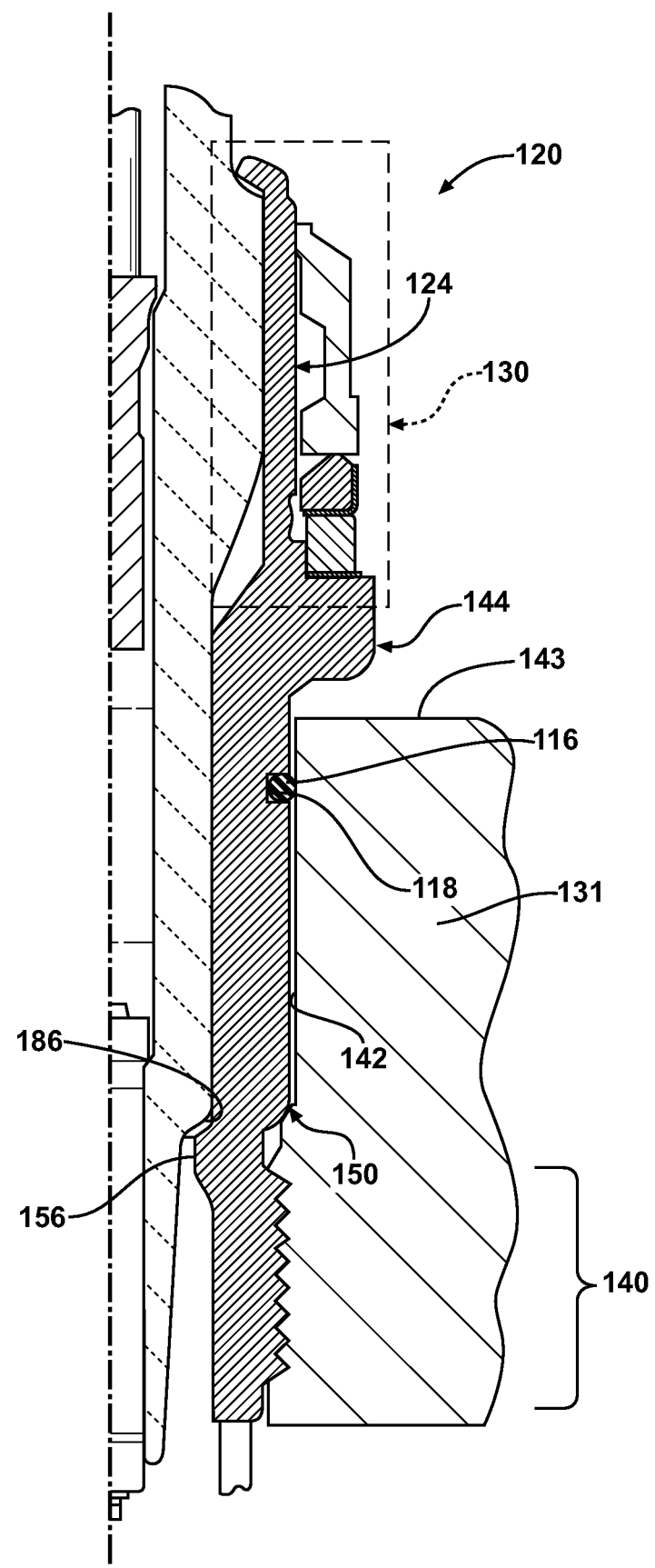
FIG. 3 is a partial cross-sectional view of a spark plug constructed in accordance with another aspect of the invention.

In FIG. 3, a spark plug assembly constructed in accordance with another aspect of the invention is shown generally at 120, wherein the same reference numerals as used above, offset by a factor of 100, are used to identify like features as described above. One notable difference in this embodiment is that the assembly 120 has a vibration control element 116 disposed between the shell 124 and an opening 142 in a cylinder head 131. The vibration control element 116 preferably allows relative axial movement between the shell 124 and the cylinder head 131, while dampening vibrations in a radial direction. The vibration control element 116 can be constructed from any suitable elastic material, including O-rings or the like, spring washers, conical springs, or flexible membranes, for example. To facilitate maintaining the element 116 in position, an annular groove 118 is shown extending into the outer surface of the shell 124 between a sealing seat 150 and a flange 144 which remains out of contact with an upper planar surface 143 of the cylinder head 131, although the groove 118 could be formed in the opening 142 of the cylinder head 131 and the seal disposed in the groove of the cylinder head 131, if desired. The seal element 116 is thus disposed in the groove 118 to extend radially outwardly from the groove 118 for sealing and vibration dampening engagement with the cylinder head 131. Some additional reference numerals, offset by a factor of 100, have been applied in FIG. 3 indicating like features as those discussed above without being discussed further, including 130, 140, 156 and 186. Otherwise, the spark plug assembly 120 is the same as discussed above.

Figure 4:
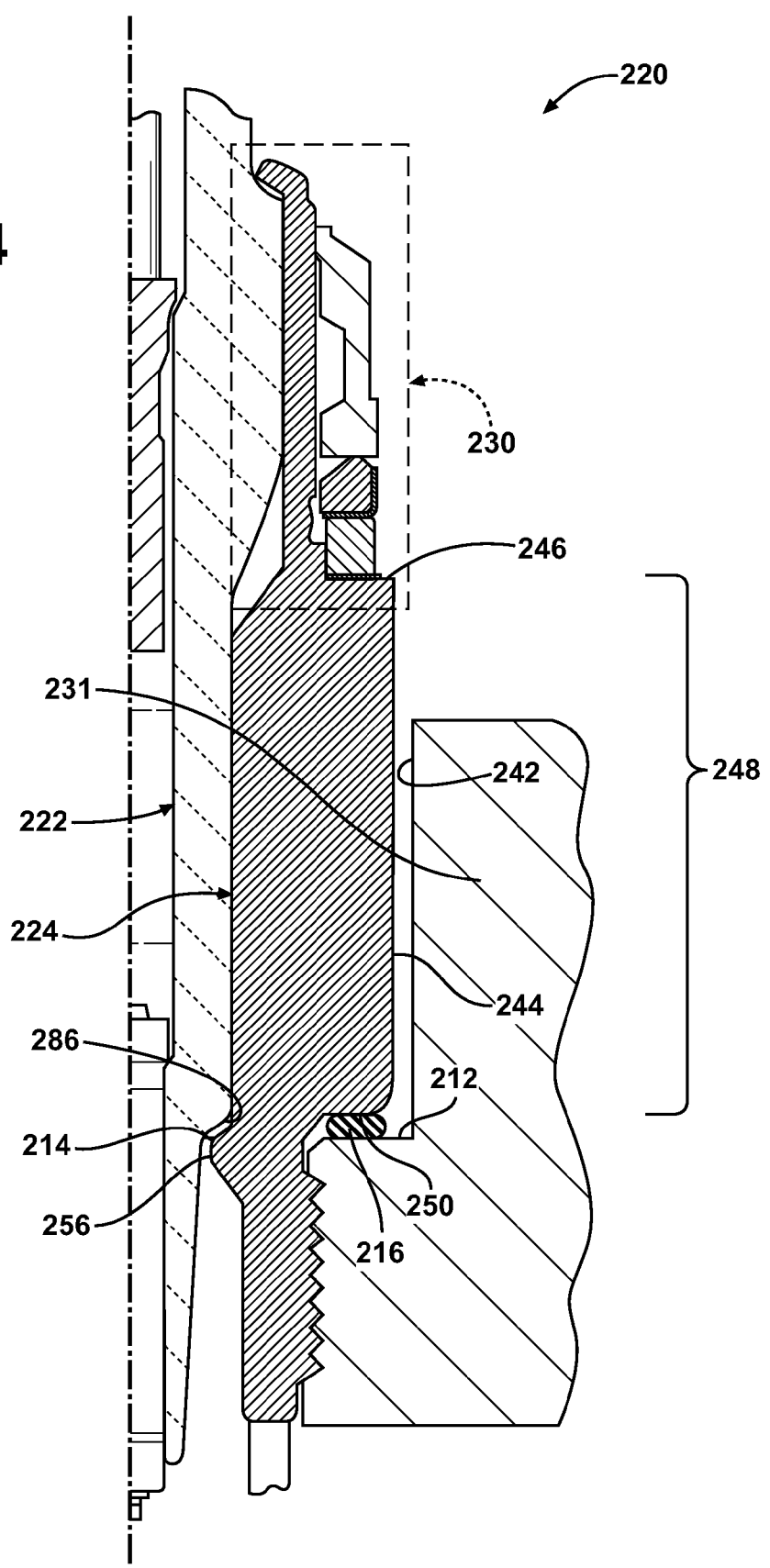
FIG. 4 is a partial cross-sectional view of a spark plug constructed in accordance with yet another aspect of the invention.

In FIG. 4, a spark plug assembly constructed in accordance with another aspect of the invention is shown generally at 220, wherein the same reference numerals as used above, offset by a factor of 200, are used to identify like features as described above. The assembly 220 is similar to the spark plug assembly 20, however, an outer flange 244 extends along the full length of a cylindrical portion 248 for receipt in an opening 242 of a cylinder head 231, wherein the flange 244 extends between an upper annular, planar shoulder 246 and an annular, planar sealing seat 250, wherein the shoulder 246 and the sealing seat 250 are axially aligned and parallel with one another. The sealing seat 250, as with the previously discussed sealing seat 50, is adjacent substantially radially aligned with a seal gasket 214 that establishes a seal between a lower shoulder 286 of the insulator 222 and a lower internal sealing flange 256 in the shell 224. Accordingly, as discussed above, upon full insertion of the spark plug assembly into the opening 42, the preload "as assembled" on the sensor assembly 230 remains unaffected, thereby providing a true and accurate indication of the combustion pressure within the cylinder bore. As with the spark plug assembly 120, a vibration control gasket 216 can be incorporated. The gasket 216 is disposed between the sealing seat 250 of the shell flange 244 and the sealing seat 212 in the opening 242 of the cylinder head 231, wherein the gasket 216 functions as discussed above.

It should be recognized that the embodiment illustrated in FIGS. 2 and 3 are well suited for relatively small spark plug constructions, such as those having a diameter as small as about 10 mm, although these constructions are equally suitable for larger diameter spark plug assemblies.

Obviously, many modifications and variations of the present invention are possible in light of the above teachings. It is, therefore, to be understood that within the scope of the appended claims, the invention may be practiced otherwise than as specifically described.

What is claimed is:

1. A spark plug assembly, comprising:
a generally annular ceramic insulator having an upper shoulder and a lower shoulder;
a metal annular outer shell having an outer surface extending continuously from a proximal end to an opposite fastening end and a central cavity bounded by an inner surface,
said inner surface having a flange extending radially inwardly to axially confront said lower shoulder of said insulator,
said outer surface having an external threaded region adjacent said fastening end and an annular sealing seat extending radially outwardly from said threaded region adjacent said flange, wherein said sealing seat is aligned substantially radially with said flange,
said outer surface having an annular shoulder extending radially between said sealing seat and said proximal end, said annular shoulder being longitudinally spaced from said sealing seat by a portion of said outer surface,
said shell having an annular turnover extending radially inwardly toward said cavity adjacent said proximal end, said turnover axially confronting said upper shoulder of said insulator and inhibiting axial movement of said insulator relative to said outer shell; and
a sensor assembly received about said outer shell between said shoulder of said shell and said turnover, said sensor assembly being responsive to send a signal in response to relative axial movement between said insulator and said outer shell.

2. The spark plug assembly of claim 1 wherein said sealing seat is aligned axially with said lower shoulder.

3. The spark plug assembly of claim 1 wherein said sealing seat is tapered.

4. The spark plug assembly of claim 1 wherein said shoulder of said shell extends radially outwardly relative to said sealing seat.

5. The spark plug assembly of claim 3 wherein said portion of said outer surface of said shell spacing said shoulder from said sealing seat is substantially cylindrical.

6. A spark plug assembly, comprising:
a generally annular ceramic insulator having an upper shoulder and a lower shoulder;
a metal annular outer shell having an outer surface extending continuously from a proximal end to an opposite fastening end and a central cavity bounded by an inner surface;
said inner surface having a flange extending radially inwardly to axially confront said lower shoulder of said insulator;
said outer surface having an external threaded region adjacent said fastening end and an annular sealing seat extending radially outwardly from said threaded region adjacent said flange;
said outer surface having an annular shoulder extending radially between said sealing seat and said proximal end, said annular shoulder being longitudinally spaced from said sealing seat by a portion of said outer surface;

said shell having an annular turnover extending radially inwardly toward said cavity adjacent said proximal end, said turnover axially confronting said upper shoulder of said insulator and inhibiting axial movement of said insulator relative to said outer shell;

a sensor assembly received about said outer shell between said shoulder of said shell and said turnover, said sensor assembly being responsive to send a signal in response to relative axial movement between said insulator and said outer shell; and wherein said outer surface of said shell has an annular groove between said sealing seat and said shoulder of said shell, and further comprising a seal received in said groove and extending radially outwardly from said outer surface.

7. An internal combustion engine component, comprising:
a cylinder head having an upper surface and a lower surface with an opening extending between said upper and lower surfaces, said opening having a reduced diameter region adjacent said lower surface and an increased diameter region adjacent said upper surface with a sealing seat extending between said reduced diameter region and said increased diameter region;
a spark plug assembly configured to be fastened in said opening, said spark plug assembly, comprising:
a generally annular ceramic insulator having an upper shoulder and a lower shoulder;
a metal annular outer shell having an outer surface extending continuously between a proximal end and an opposite fastening end with a central cavity bounded by an inner surface,
said inner surface having a radially extending flange axially confronting said lower shoulder of said insulator,
said outer surface having an external threaded region configured for threaded engagement with said reduced diameter region of said cylinder head and an annular sealing seat extending adjacent said threaded region and axially confronting said sealing seat of said cylinder head, wherein said sealing seats are substantially radially aligned with said flange,
said outer surface having an annular shoulder extending radially between said sealing seat and said proximal end, said annular shoulder being longitudinally spaced from said sealing seat by a portion of said outer surface,
said shell having an annular turnover adjacent said proximal end axially confronting said upper shoulder of said insulator; and
a sensor assembly received about said outer shell between said shoulder and said turnover, said sensor assembly being responsive to send a signal in response to relative axial movement between said insulator and said outer shell.

8. The internal combustion engine component of claim 7 wherein said sealing seat of said shell is aligned axially with said shoulder of said shell.

9. The internal combustion engine component of claim 7 wherein said outer surface of said shell is substantially cylindrical between said sealing seat of said shell and said shoulder of said shell.

10. The internal combustion engine component of claim 7 wherein said sealing seats are tapered.

11. The internal combustion engine component of claim 7 wherein said sealing seats are substantially planar.

12. The internal combustion engine component of claim 7 wherein an annular gap is formed between said outer surface of said shell and said increased diameter region of said opening in said cylinder head.

13. The internal combustion engine component of claim 7 wherein said shoulder of said shell extends radially outwardly relative to said sealing seat of said shell.

14. The internal combustion engine component of claim 13 wherein said shoulder of said shell extends at least in part over said upper surface of said cylinder head.

15. The internal combustion engine component of claim 14 wherein said shoulder of said shell remains axially spaced from said upper surface of said cylinder head when said sealing seats axially confront one another, and wherein said shoulder of said shell and said upper surface of said cylinder head present an open space therebetween.

16. An internal combustion engine component, comprising:
a cylinder head having an upper surface and a lower surface with an opening extending between said upper and lower surfaces, said opening having a reduced diameter region adjacent said lower surface and an increased diameter region adjacent said upper surface with a sealing seat extending between said reduced diameter region and said increased diameter region;
a spark plug assembly configured to be fastened in said opening, said spark plug assembly, comprising:
a generally annular ceramic insulator having an upper shoulder and a lower shoulder;
a metal annular outer shell having an outer surface extending continuously between a proximal end and an opposite fastening end with a central cavity bounded by an inner surface;
said inner surface having a radially extending flange axially confronting said lower shoulder of said insulator;
said outer surface having an external threaded region configured for threaded engagement with said reduced diameter region of said cylinder head and an annular sealing seat extending adjacent said threaded region and axially confronting said sealing seat of said cylinder head;
said outer surface having an annular shoulder extending radially between said sealing seat and said proximal end, said annular shoulder being longitudinally spaced from said sealing seat by a portion of said outer surface;
said shell having an annular turnover adjacent said proximal end axially confronting said upper shoulder of said insulator; and
a sensor assembly received about said outer shell between said shoulder and said turnover, said sensor assembly being responsive to send a signal in response to relative axial movement between said insulator and said outer shell; wherein
said outer surface of said shell is substantially cylindrical between said sealing seat of said shell and said shoulder of said shell; and
said outer surface of said shell has an annular groove between said sealing seat of said shell and said shoulder of said shell, and further comprising a seal configured to engage said increased diameter region of said opening received in said groove.

* * * * *